United States Patent
Fischer

[11] 4,066,226
[45] Jan. 3, 1978

[54] AIRFOIL, REDUCED PROFILE, "Y" FLOW, HYBRID

[76] Inventor: Kenneth Edmund Fischer, 716 E. Main St., Berlin, Pa. 15530

[21] Appl. No.: 675,602

[22] Filed: Apr. 9, 1976

[51] Int. Cl.² ............................................. B64C 3/02
[52] U.S. Cl. ...................................... 244/36; 244/130
[58] Field of Search ................. 244/35 R, 36, 118 R, 244/40 R, 42 CC, 130

[56] References Cited

U.S. PATENT DOCUMENTS

| | | | |
|---|---|---|---|
| 2,408,788 | 10/1946 | Ludington et al. | 244/35 R |
| 2,562,227 | 7/1951 | Zobel | 244/35 R |
| 2,989,269 | 6/1961 | LeBel | 244/36 |
| 3,126,169 | 3/1964 | Kucher | 244/36 |
| 3,193,215 | 7/1965 | Dunham | 244/36 |
| 3,974,986 | 8/1976 | Johnstone | 244/40 R |

FOREIGN PATENT DOCUMENTS

| | | | |
|---|---|---|---|
| 47,043 | 3/1933 | Denmark | 244/35 R |
| 1,064,349 | 8/1959 | Germany | 244/118 R |

Primary Examiner—Trygve M. Blix
Assistant Examiner—Galen Barefoot

[57] ABSTRACT

A hybrid airfoil of extremely short span and thick chord section having a large portion of the trailing edge truncated with openings in the ends or side for air to enter and openings in the rear for the airflow to exit describing a flow pattern which resembles the letter "Y" within the airfoil for the express purpose of enhancing the performance of the short span truncated airfoil.

1 Claim, 5 Drawing Figures

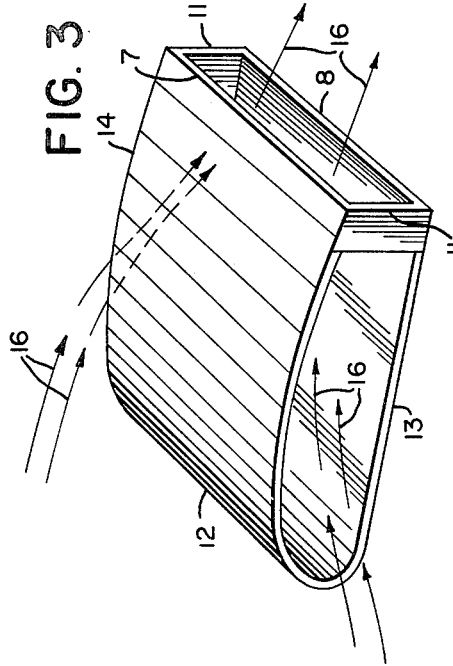
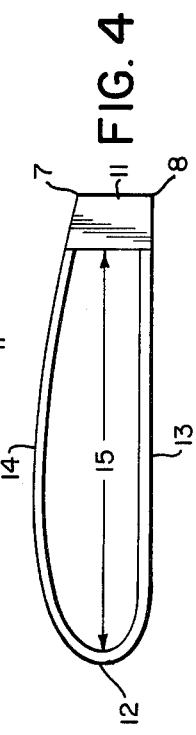
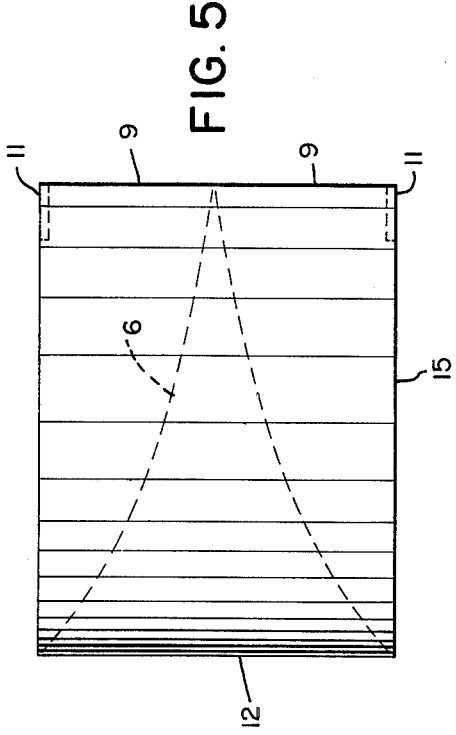
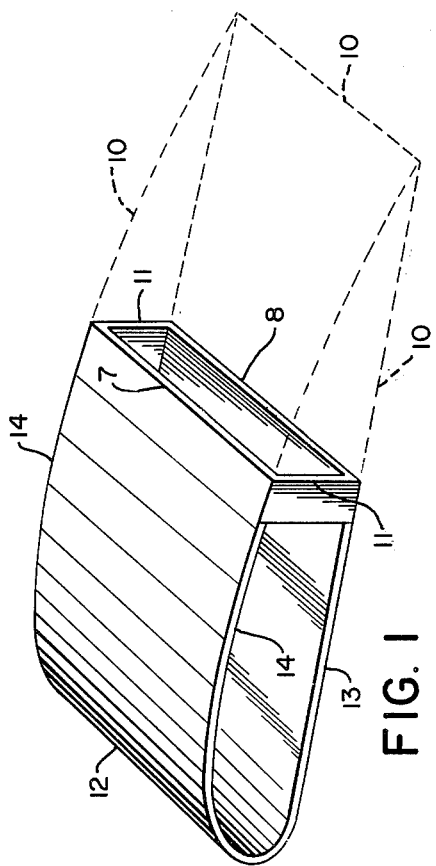
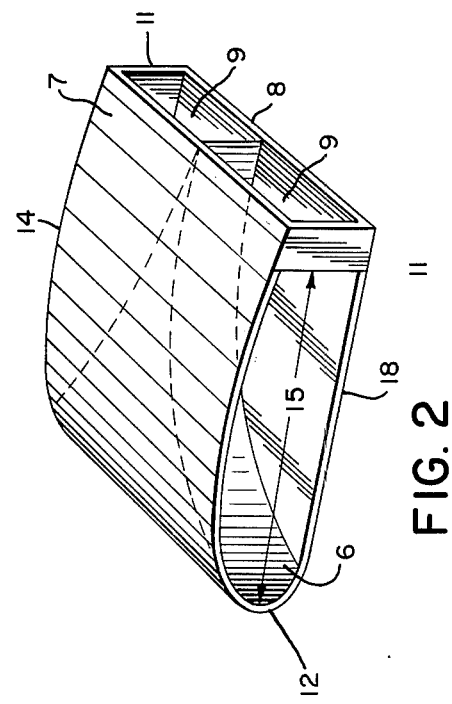

AIRFOIL, REDUCED PROFILE, "Y" FLOW, HYBRID

This invention relates to an hybrid airfoil, for producing lift or thrust, which embodies the front portion of a conventional airfoil, eliminating the rear portion or trailing edge and leaving the area of highest lift. This results in a somewhat shortened airfoil in proportion to it's thickness. The ends of the airfoil and also the trailing edge can be open, allowing the airflow to enter the ends and to exit along the new trailing upper and lower edges, producing less drag. The width, or what is known as wingspan, in practice, might be quite narrow. The primary object of my invention is to make possible reduced profile aircraft of various configurations, which might be narrow enough to land on any road or highway and also have a shorter overall length.

Another object of my invention is to be able to build aircraft at a much lower cost than previously possible and in much less time. Another object of my invention is to be able to stress the airframe of the aircraft for a much higher 'G' loading than has been previously possible within a reasonable budget. The combination of low cost and high 'G' loading is ideal for remote controlled or pilotless aircraft. Still another object of my invention is making possible the construction of a low cost life raft for space ships which could return from orbit and land without the very elaborate equipment of earlier spacecraft.

Still further objects and advantages of my invention will become apparent from the following description and accompanying drawing, of which thereof:

FIG. 1 is a perspective view of an airfoil section with dashed lines showing the portion eliminated from the conventional airfoil. The remaining construction is the basic invention as described herein, with the possible modification in FIG. 2.

FIG. 2 is a perspective view of the basic invention as modified, showing the placement of ducts for the 'Y' Flow through the airfoil. FIG. 3 is a perspective view of the basic invention with arrows showing the path of airflow through the airfoil, which reduces the drag caused by the severe truncation.

FIG. 4 is a side or end view of the basic invention with the entrance of the air ducts covering nearly the entire view.

FIG. 5 is a top view of the basic invention with the shaded area showing the placement of the pilots and passenger and cargo compartment.

As illustrated in the accompanying drawings, this useful and novel device consists of an airfoil section similar to the forward portion of a conventional airfoil, the thin knifeblade trailing edge, 10, altered or omited, somewhat like but not necessarily identical to FIG. 1, the basic invention shown in solid lines and the discarded portion, 10, of the conventional airfoil shown in dashed lines. The performance of the airfoil might be increased by allowing or forcing the flow of air, 16, to enter the ends of the airfoil and to exit the rear of the airfoil. This reduced profile section of airfoil becomes the basic airframe of various forms of aircraft and spacecraft and may also be used as a thrust device or a windmill.

Chord thickness, chord length and wingspan may vary, depending on the application. It is understood that the device, as described and illustrated, may undergo changes in construction of details within the present scope of the invention. Essential elements of the invention are, 6, (shaded area) pilot's and passenger and cargo compartment. The upper trailing edge is 7, and the lower trailing edge is 8 and in between is the opening, 9, where the 'Y' flow exits the airfoil. The discarded or omitted portion, (in dashed lines) is 10.

The side trailing edge 11, may be extended back a distance about equal to the length of the airfoil and an Empennage added for control. The leading edge of the airfoil is, 12, and the upper surface is 14, with, 13 being the lower surface. The parameters of the opening in the side or ends is, 15, and the "Y" FLOW through the airfoil is, 16, which might be increased by means of ducted fans or other air movers and will also be enhanced by the flow of the airstream past the new lower edge 8, and the new upper trailing edge 7, for more efficient operation.

Reciprocally, the airfow leaving the upper and lower surfaces of the airfoil will be smoothed by the "Y" FLOW of air, 16, through the truncated airfoil, reducing turbulence and thereby, drag. The best method of use is, as likely as not, that of the NAERO-PLANE CONFIGURATION, as shown in disclosure document 040331, "Y" FLOW AIRFOIL, date of receipt, Apr. 18, 1975, a photo-copy of which is enclosed. This configuration consists of the basic invention shown in FIG. 2, with ducts added, and the addition of twin booms and an empennage similar to the world war II, P-38 aircraft.

It is understood that the invention may undergo many changes in form, size, and shape, and the addition of the necessary control surfaces and other state of the art appliances, does not diminish the usefulness nor render it less novel or innovative.

I claim:

1. An airfoil having a conventional airfoil shape in longitudinal cross-section with a truncated trailing edge; upper and lower surfaces which provide the airfoil with a substantially rectangular planform and a closed continuous leading edge; each side of said arifoil has a side wall which extends from the leading edge adjacent the respective side of said airfoil to substantially the center of the trailing edge forming a substantially triangular shaped compartment in the center of the airfoil; the side and trailing edges of said airfoil are substantially completely open and form channels with said side walls which permit the air to flow from the sides of said airfoil between said upper and lower surfaces and exit through said open truncated trailing edge.

* * * * *